Jan. 18, 1927.
J. PRIMROSE
1,614,689
OIL STILL
Filed April 7, 1921
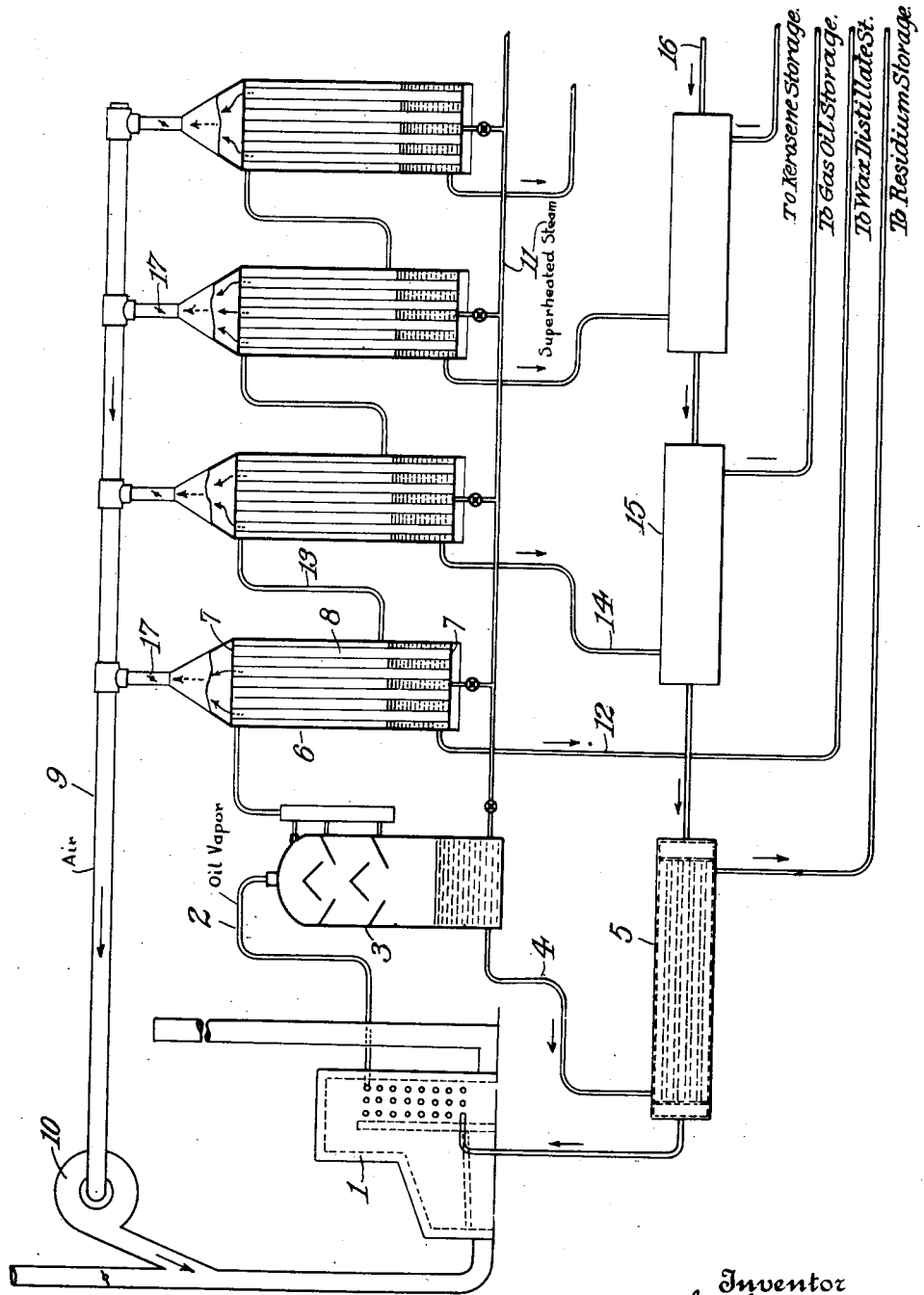
Inventor
John Primrose
By his Attorneys
Kerr, Page, Cooper & Hayward Patented Jan. 18, 1927.

1,614,689

UNITED STATES PATENT OFFICE.

JOHN PRIMROSE, OF DONGAN HILLS, NEW YORK, ASSIGNOR TO POWER SPECIALTY COMPANY, OF NEW YORK, N. Y., A CORPORATION OF NEW YORK.

OIL STILL.

Application filed April 7, 1921. Serial No. 459,234.

My invention is an improvement in processes for distilling crude oils for the recovery of the useful products of different degrees of volatility such as gasolene, kerosene and the heavier distillates. The object of the invention, in the main, is to recover the distillate products more economically than has heretofore been done, by the conservation and utilization of the heat developed and also to simplify the apparatus employed.

In general, the new process which I have devised consists in subjecting the crude oil in a still to heat in the usual way, the temperature being such as will produce the vaporization of the heaviest hydrocarbon which it is desired to distill. The vapors thus produced are passed to and through a tower or like device where the volatile vapors are separated from the remaining oil or residuum, and are then passed through a series of air cooled condensers, the temperature of each being controlled by the amount of air passing through it, so as to condense out the heaviest hydrocarbon vapor, the remaining vapor being passed to the next succeeding air cooled condenser and so on through the series.

The air heated by its passage through the condensers is returned to the furnace where it is utilized for promoting combustion and heating the crude oil originally, and the heat of the residuum and of the heavier separated distillates is also utilized in heat exchangers to heat the crude oil on its way to the still.

This process may be carried out by various forms of apparatus, but for purpose of illustration I have shown a simple form which fully meets all of the requirements of commercial practice. This apparatus is shown in the accompanying drawing, which is a schematic illustration of such devices as are necessary to a full understanding of the invention.

In the illustration, 1 designates a still of any proper and usual character, from the heating pipes or coils of which the vapors are led by a pipe 2 to a separating tower or other known device 3 for separating out from the vapors the heavy oil or residuum which latter collects in the bottom of the tower and is conducted off by a pipe 4 to a heat exchanger 5.

The vapors from the tower are led to an oil cooled condenser 6. This is or may be a chamber, preferably composed of cylindrical shells, heat insulated, with tube sheets 7 at top and bottom into which relatively long tubes 8 are expanded. The bottom tube sheet is exposed to the atmosphere and the closed conical top is connected to a pipe 9 with which a fan or suction pump 10 is connected up, and which draws the cold air up through the tubes 8 and delivers it to the furnace where it is used to promote the combustion of the oil or other fuel used to heat the crude oil undergoing distillation.

There are a series of these air-cooled condensers, preferably, or in this case, four; all similar in construction, and all provided with any suitable and known means for regulating the amount of cold air passing through them. A pipe 11 conveys superheated steam to the bottom of each condenser and also to the bottom of the separating tower, so that the vapor tension in each may be regulated to produce the distillate desired.

When in operation the vapors in the first condenser are cooled to a point which permits only the heaviest hydro-carbons or what is known as the wax distillates to separate out, and these are drawn off by a pipe 12. The uncondensed vapors pass over to the next condenser by the pipe 13, in which the next heavier distillate or gas oil is separated out. This oil is led by a discharge pipe 14 into a heat exchanger 15. From this second condenser the uncondensed vapor is led to the third condenser, and so on.

The crude oil is led by a pipe 16 through the heat exchangers 15 and 5 whereby it is heated to a relatively high temperature by the time it reaches the still. The amount of cold air drawn through the condensers will determine the character of the distillate which each of said condensers produces. Any suitable means may be provided for such regulation, and I have shown dampers 17 in the outlet pipes of the condensers for this purpose.

By following the process above described, an actual and substantial saving in the amount of fuel required for the distillation of a given quantity of crude oil is effected, and the nature of the elements or devices used in carrying out the process more than compensates for their number by their simplicity and cheapness.

What I now claim as my invention is:—

1. The process of fractional distillation herein described which consists in heating a still with products of combustion evolved in a furnace, passing from the still the uncondensed vapors through a series of air cooled condensers having different temperatures, recovering from each condenser the distillate resulting from the temperature, drawing cooling air through the various condensers, and returning the air which is drawn through the condensers to the furnace for promoting the combustion of the fuel burned in the furnace and used for distilling the oil to thereby usefully recover heat from the condensers.

2. The process of fractional distillation which consists in burning fuel products and air in a furnace and with the products of combustion thus evolved subjecting crude oil to a temperature sufficient to vaporize the heaviest oils which it is desired to distill, passing the vapors to a separator in which the vapors are separated from the residuum, then passing the vapors through a succession of air cooled condensers of different temperatures, recovering from each the distillate resulting from such temperature, returning the air which is heated by being drawn through the condensers to the furnace, and passing the distillates to heat exchangers through which the crude oil on its way to the still is passed.

In testimony whereof I hereto affix my signature.

JOHN PRIMROSE.